H. TRUMBULL.
Clothes-Pounder.

No. 200,008.      Patented Feb. 5, 1878.

WITNESSES:
H. Rydquist
J. H. Scarborough

INVENTOR:
H. Trumbull
BY
ATTORNEYS.

UNITED STATES PATENT OFFICE.

HARVEY TRUMBULL, OF CENTRAL COLLEGE, OHIO.

IMPROVEMENT IN CLOTHES-POUNDERS.

Specification forming part of Letters Patent No. 200,008, dated February 5, 1878; application filed April 30, 1877.

*To all whom it may concern:*

Figure 1:
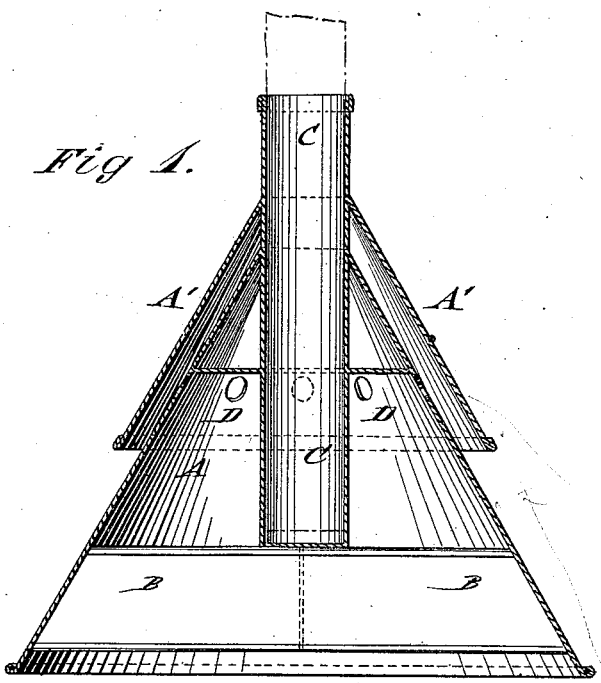
Figure 2:
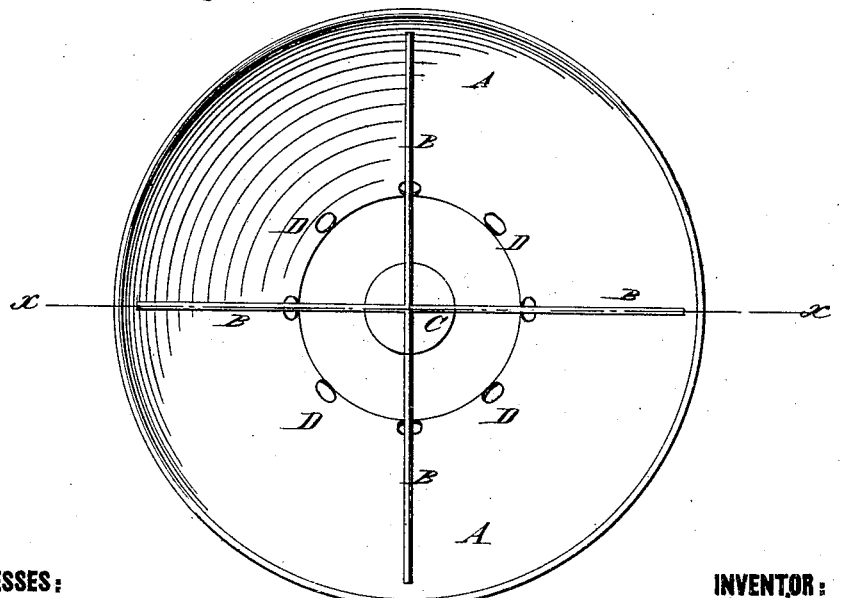

Be it known that I, HARVEY TRUMBULL, of Central College, in the county of Franklin and State of Ohio, have invented a new and Improved Clothes-Washer, of which the following is a specification:

In the accompanying drawing, Figure 1 represents a vertical central section on line $x\ x$, Fig. 2, of my improved clothes-washer, and Fig. 2 is a bottom view of the same.

Similar letters of reference indicate corresponding parts.

A represents the main cone or body of my washer; A', the smaller upper cone; B, the cross bars or braces; C, the socket for the handle; and D the air-holes. The upper cone A' is made only about one-half the length of the lower one A, so that the greater part of the air in cone A can escape before the upper one enters the water, and thus prevent the splashing of the water that otherwise ensues. As soon as the lower edge of the upper cone A' enters the water what air is contained therein and in the upper end of the cone A is prevented from escaping, and is condensed in the two cones. This volume of air is sufficient to overcome the vacuum which is formed when the whole volume of air is driven out, and prevents the clothes from adhering to the bottom of the pounder, which would cause the operator great exertion in lifting them to the surface of the water.

By making the cone A' but half the length of the lower one, as soon as the lower edge of the upper cone reaches the top of the water the air rushes into both cones, and the clothes at once release their hold on the lower end of the lower cone and fall back into the water.

I am aware of the patent to S. F. Hawley, October 21, 1873, and this I disclaim. Where his outer cone is the largest mine is the smallest, and where one of his cones is movable back and forth both of mine are rigid.

Having thus described my invention, I claim—

The combination of the large cone A, having air-holes D, small cone A', braces B, and socket C, the upper cone being but about one-half the length of the lower one, substantially as shown and described.

HARVEY TRUMBULL.

Witnesses:
    JANE B. SKEEL,
    MARY C. SKEEL.